(12) United States Patent
Fan et al.

(10) Patent No.: US 7,938,552 B2
(45) Date of Patent: May 10, 2011

(54) REFLECTING DEVICE AND APPLICATION THEREOF IN BACKLIGHT UNIT FOR ENHANCING LIGHT DIRECTIVITY

(75) Inventors: Yi-Hua Fan, Tao-Yuan (TW); Rong-Jhe Chen, Tao-Yuan (TW); Yi-Lin Liao, Tao-Yuan (TW); Sheng-Kai Chang, Tao-Yuan (TW); Kai-Yin Huang, Tao-Yuan (TW)

(73) Assignee: Chung Yuan Christian University, Tao-Yuan (TW)

( * ) Notice: Subject to any disclaimer, the term of this patent is extended or adjusted under 35 U.S.C. 154(b) by 266 days.

(21) Appl. No.: 12/144,930

(22) Filed: Jun. 24, 2008

(65) Prior Publication Data

US 2009/0316402 A1    Dec. 24, 2009

(51) Int. Cl.
*G09F 13/04* (2006.01)

(52) U.S. Cl. ........ 362/97.3; 362/247; 362/301; 362/346
(58) Field of Classification Search ................ 362/97.3, 362/247, 296.07, 297, 301, 346, 241
See application file for complete search history.

(56) References Cited

U.S. PATENT DOCUMENTS 7,163,315 B2 * 1/2007 Chang et al. ................. 362/97.3

* cited by examiner

*Primary Examiner* — Stephen F Husar
(74) *Attorney, Agent, or Firm* — WPAT, PC; Justin King

(57) ABSTRACT

The present invention discloses a backlight unit having a reflecting device to enhance light directivity. The backlight unit comprises a light source module, comprising at least one light source, and a reflecting device. The reflecting device is provided to surround the light source or light source module and comprises a first surface. Besides, the first surface comprises at least two planes where every two planes are connected with an included angle more than 90 degrees and less than 180 degrees.

11 Claims, 8 Drawing Sheets

REFLECTING DEVICE AND APPLICATION THEREOF IN BACKLIGHT UNIT FOR ENHANCING LIGHT DIRECTIVITY

BACKGROUND OF THE INVENTION

1. Field of the Invention

The present invention is generally related to a backlight unit in a liquid crystal display (LCD), and more particularly to a backlight unit having a reflecting device for enhancing light directivity.

2. Description of the Prior Art

Light emitting diodes (LEDs) have the characteristics of low power consumption, high efficiency, long lifetime, etc., as well as mercury-free environmental advantage. Besides, as LEDs are applied as a backlight source for various flat panel displays, excellent color representation can be obtained. Thus, the application of LEDs in displays has drawn great attention in the recent years.

A backlight unit can be categorized into edge type and direct type, based on the position of the light source. In the past, LCDs are predominantly applied in notebook computers and monitors and thus the backlight units thereof require only light weight, compact size, and thin thickness. Thus, an edge type backlight unit can satisfy such requirements. However, as the development of a super-large-sized backlight unit for a LCD television is proceeding, the considered constituents include sufficient image brightness, a wide viewing angle, high contrast, and long usage lifetime. Therefore, the direct type backlight unit becomes the main stream in the application for large-size LCDs.

In a traditional direct type LED backlight unit, the upright plate 140 is provided to surround the LED light source module, as shown in FIG. 1A (three-dimensional view) and FIG. 1B (side view). The upright plate 140 is to block and reflect the light emitted from the LED light source 122 (either Lambertian or side-emitting type LED) to the upright plate 140. The upright plate 140 is not designed to have additional reflecting structures or light-directing structures. Thus, on top of the upright plate 140, optical components, such as diffuser sheet, diffuser plane, or brightness enhancement film (BEF), are provided. The optical performance of the backlight unit can be improved by diffusing light and controlling light directivity via various optical components.

The upright plate 140 is used to simply reflect light without the functionality of controlling light directivity. Besides, the light reflected by the upright plate 140 is not evenly distributed. The optical performance of the backlight unit cannot be improved without light diffusing optical components, such as diffuser sheet or diffuser plane, to evenly distribute light and without light-directing component, such as brightness enhancement film, to control light directivity. The use of various optical components is unavoidable in order to control the light directivity and enhance the brightness of the backlight unit. However, the above mentioned optical components take space in a backlight unit and it becomes obstruction in thinning a LCD. Besides, the use of optical components increases production cost.

To solve the above-mentioned problems, a new structure for a backlight unit is still needed to achieve the target of thinning a LCD and to improve light directivity, enhance brightness, and lower production cost, in order to fulfill market need.

SUMMARY OF THE INVENTION

The present invention provides a backlight unit having a reflecting device for enhancing light directivity. By such a reflecting device provided to surround the light source to control light directivity, the backlight unit in a LCD does not need other optical components, such as diffuser sheet, diffuser plane, or brightness enhancement film (BEF), to improve the optical performance thereof so as to decrease the thickness thereof.

The present invention provides a backlight unit having a reflecting device to enhance light directivity. The backlight unit comprises a light source module, comprising at least one light source, and a reflecting device. The reflecting device is provided to surround the light source or light source module and comprises a first surface. Besides, the first surface comprises at least two planes where every two planes are connected with an included angle more than 90 degrees and less than 180 degrees. On the other hand, the reflecting device further comprises a second surface. The second surface comprises at least two planes where every two planes are connected with an included angle more than 90 degrees and less than 180 degrees. The at least two planes of the first surface form a concave surface, the concave surface has a notch facing toward the light source, and the concave surface reflects the light side-emitted from the light source to direct the light toward the vertical direction of the light source. The at least two planes of the second surface form a concave surface, the concave surface has a notch facing toward another light source, and the concave surface reflects the light side-emitted from the another light source to direct the light toward the vertical direction of the another light source.

DESCRIPTION OF THE PREFERRED EMBODIMENTS

What is probed into the invention is a backlight unit comprising a reflecting device. Detail descriptions of the steps and compositions will be provided in the following in order to make the invention thoroughly understood. Obviously, the application of the invention is not confined to specific details familiar to those who are skilled in the art. On the other hand, the common steps and compositions that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

Figure 1A:
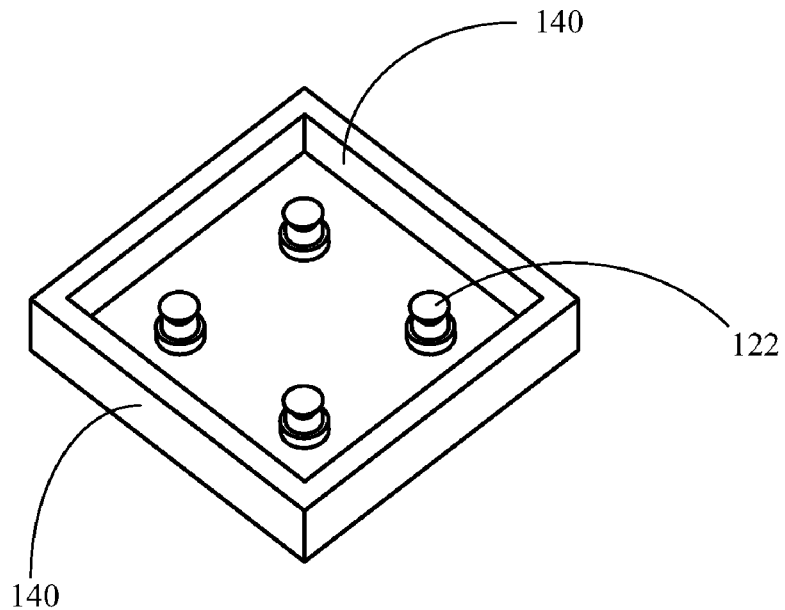
FIG. 1A is a three-dimensional schematic diagram of a reflecting device surrounding the LED light source module in a traditional direct type backlight unit in the prior art.
Figure 1B:
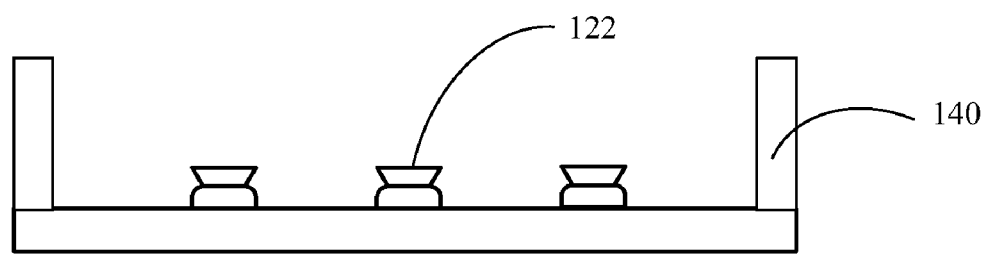
FIG. 1B is a cross-sectional schematic diagram of a reflecting device surrounding the LED light source module in a traditional direct type backlight unit in the prior art.
Figure 2A:
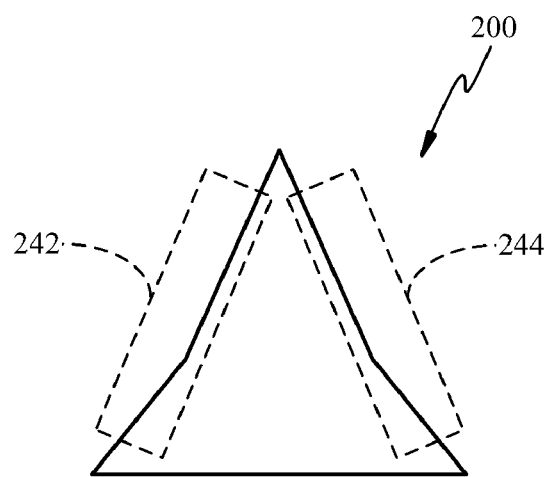
FIG. 2A is a cross-sectional schematic diagram of a reflecting device comprising a first surface and a second surface, each having two planes, according to the present invention.
Figure 2B:
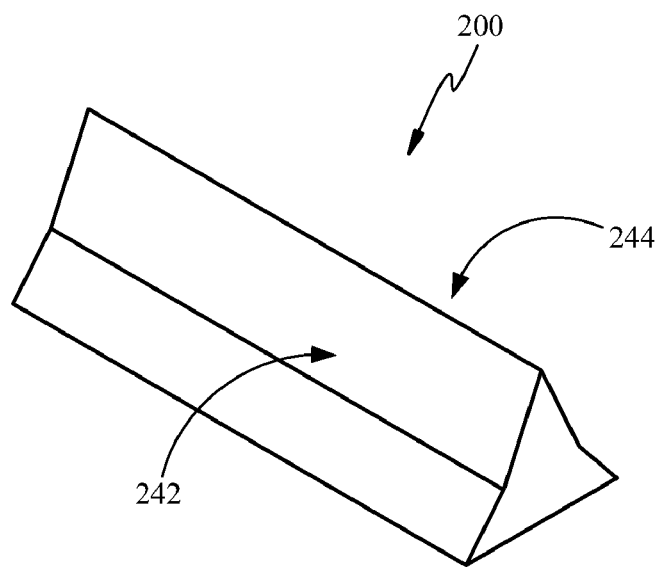
FIG. 2B is a three-dimensional schematic diagram of FIG. 2A.
Figure 2C:
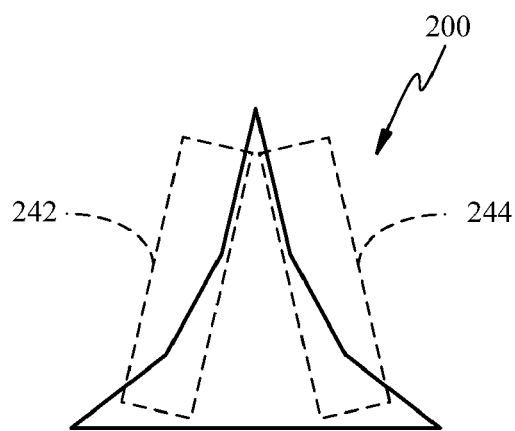
FIG. 2C is a cross-sectional schematic diagram of a reflecting device comprising a first surface and a second surface, each having three planes, according to the present invention.
Figure 2D:
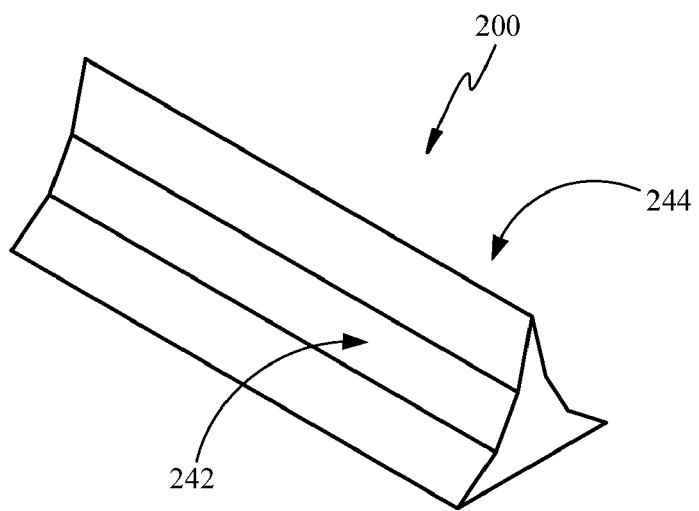
FIG. 2D is a three-dimensional schematic diagram of FIG. 2C.

Referring to FIGS. 2A~2D, a reflecting device 200 according to the invention comprises a first surface 242 and a second surface 244. The first surface 242 and the second surface 244 are provided separately on the two sides, opposing to each other, of the reflecting device 200. At least one of the first surface 242 and the second surface 244 comprises at least two planes. In the at least two planes, every two planes are connected with an included angle more than 90 degrees and less than 180 degrees. FIG. 2A is a cross-sectional schematic diagram of the reflecting device 200 comprising the first surface and the second surface, each having two planes. FIG. 2C is a cross-sectional schematic diagram of the reflecting device 200 comprising the first surface and the second surface, each having three planes. FIG. 2B and FIG. 2D are three-dimensional schematic diagrams of FIG. 2A and FIG. 2C, respectively. In addition, one of the first surface 242 and the second surface 244 or combination thereof can be made of material having a reflecting or scattering property. The reflecting device 200 can be applied in a direct type LED backlight unit or direct type CCFL backlight unit as well as a LED lighting apparatus to enhance the brightness of a lighting device.

Figure 3A:
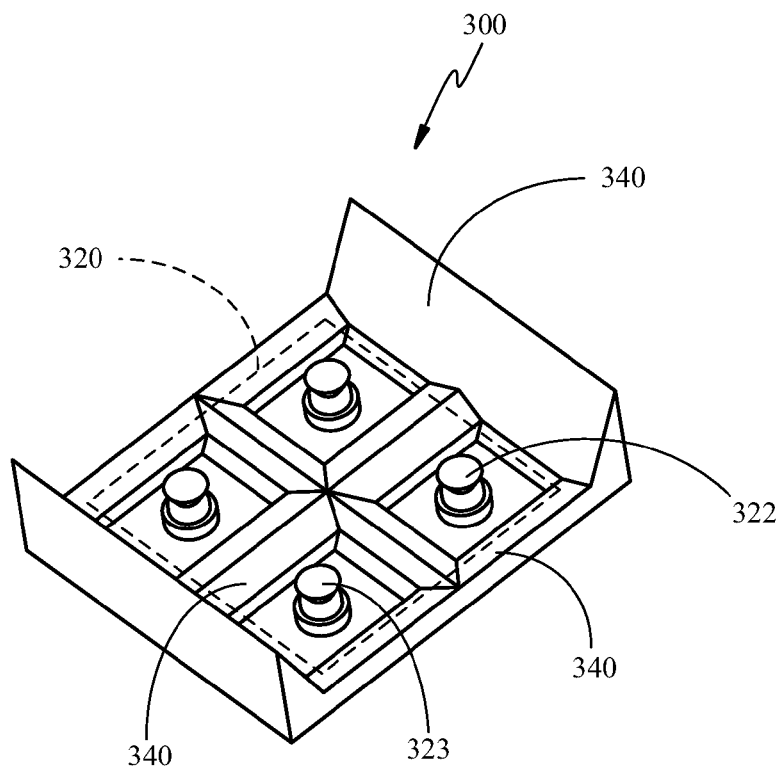
FIG. 3A shows a schematic diagram illustrating a reflecting device of a backlight unit for light directivity enhancement, provided to surround every light source, according to the present invention.
Figure 3B:
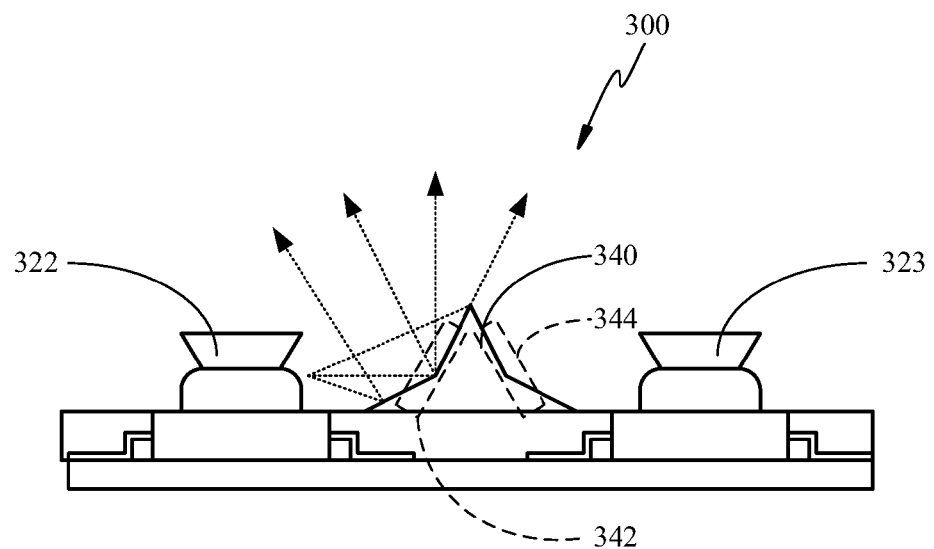
FIG. 3B is a side view of a backlight unit having a reflecting device for enhancing light directivity according to the present invention.
Figure 3C:
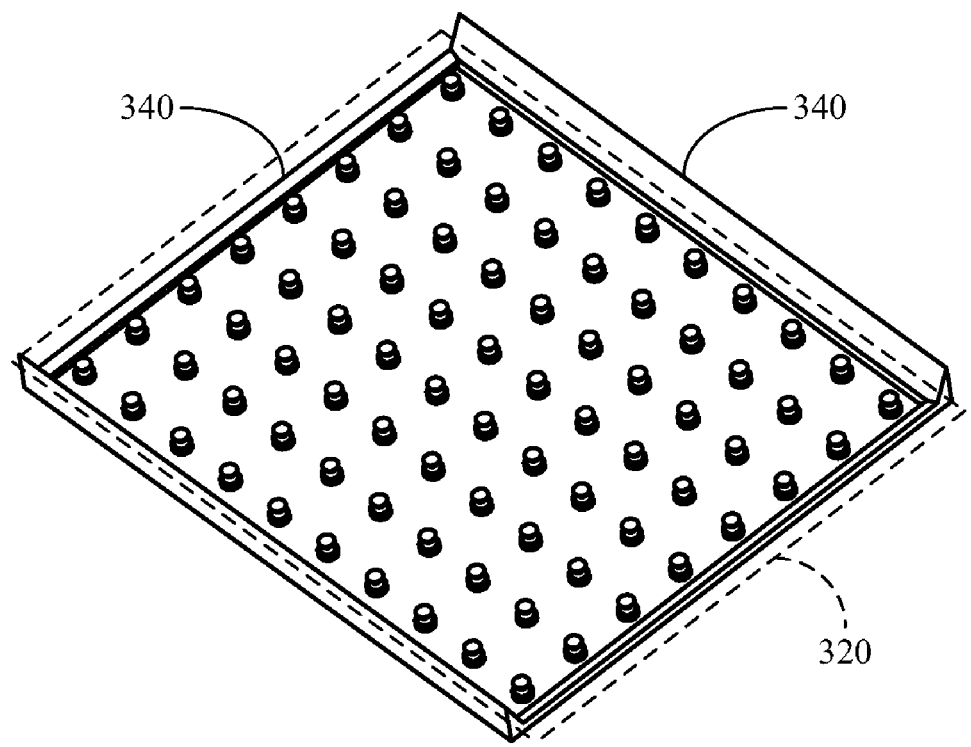
FIG. 3C shows a schematic diagram illustrating a reflecting device for light directivity enhancement, provided to surround the light source module, according to the present invention.

FIGS. 3A and 3B show the top view and side view of a backlight unit 300 having a reflecting device for light directivity enhancement according to the present invention. The backlight unit 300 comprises a light source module 320, comprising at least one light source 322, and a reflecting device 340. The reflecting device 340 is provided to surround the light source 322, as shown in FIG. 3A or to surround the light source module 320, as shown in FIG. 3C. The reflecting device 340 comprises a first surface 342 and a second surface 344. The first surface 342 and the second surface 344 are provided separately on the two sides, opposing to each other, of the reflecting device 300. At least one of the first surface 342 and the second surface 344 comprises at least two planes. In the at least two planes, every two planes are connected with an included angle more than 90 degrees and less than 180 degrees.

Figure 3D:
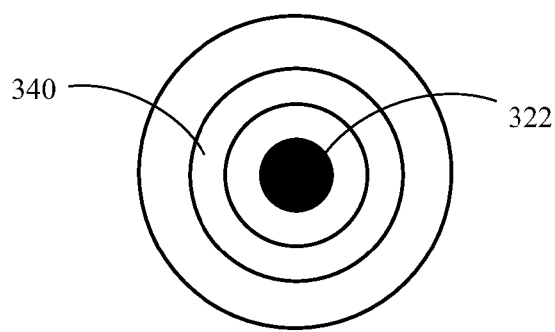
FIG. 3D shows a schematic diagram illustrating a reflecting device surrounding one single LED light source to form a circle according to the present invention.
Figure 3E:
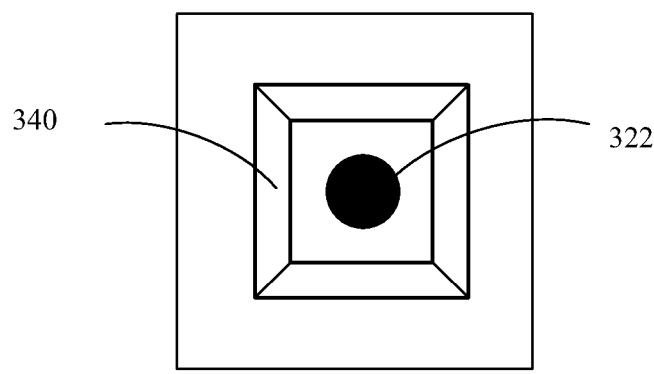
FIG. 3E shows a schematic diagram illustrating a reflecting device surrounding one single LED light source to form a square according to the present invention.
Figure 3F:
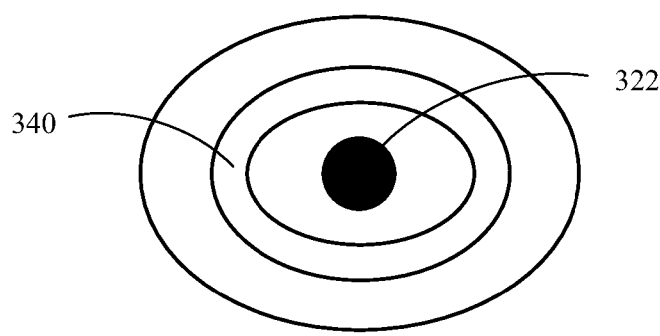
FIG. 3F shows a schematic diagram illustrating a reflecting device surrounding one single LED light source to form an ellipse according to the present invention.

In one embodiment, as shown in FIG. 3B, the at least two planes of the first surface 342 and the at least two planes of the second surface 344 form a concave surface, the concave surface has a notch facing toward the light source 322, and a second concave surface of the other light source 323, respectively. The first concave surface reflects the light side-emitted from the light source 322 to direct the light toward the vertical direction of the light source 322, referring to the light path shown by the dotted line in FIG. 3B. The second concave surface reflects the light side-emitted from the other light source 323 to direct the light toward the vertical direction of the light source 323. In addition, one of the first surface 342 and the second surface 344 or combination thereof can be made of material having a reflecting or scattering property. Besides, the light source module 320 has a direct type LED light source structure. The LED light source is a side emitting LED. For example, the LED light source is the Luxeon® III product made by Lumileds. In addition, the reflecting device 340 surrounds one single LED light source 322 or surrounds the light source module 320 to form a circle (FIG. 3D shows a schematic diagram illustrating the reflecting device 340 surrounding one single LED light source), square (as shown in FIG. 3E), ellipse (as shown in FIG. 3F), parallelogram, or any other polygon.

In another embodiment, the backlight unit 300 can be applied in adaptive dimming technique and the reflecting device 340 is an optical isolator in the adaptive dimming technique. The so-called adaptive dimming technique is to lower power consumption and enhance picture contrast by controlling the brightness variation of the backlight unit in different areas with different levels. The adaptive dimming technique can be categorized into three classes: zero dimensional (0D), one dimensional (1D), two-dimensional (2D) dimming, the corresponding light sources of which are plane light source (Electro Luminescence and organic light emitting diode), CCFL (or external electrode fluorescent lamp (EEFL) similar to CCFL), and light emitting diode (LED). The reason of using a LED as a light source in a backlight unit is that the backlight unit can be divided into the most quantities of effective control areas so as to fine adjust picture contrast.

Figure 4:
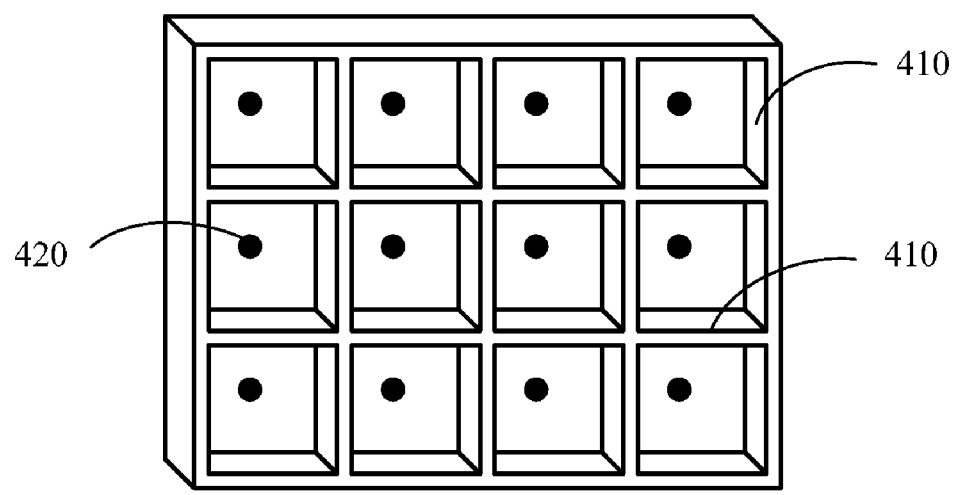
FIG. 4 shows a schematic diagram illustrating an optical isolator used in the adaptive dimming technique for a backlight unit in the prior art.

In order to control the brightness of different areas, the backlight unit has to be divided into small blocks, which are accomplished by an optical isolator. As shown in FIG. 4, an optical isolator 410 in the traditional adaptive dimming technique is a thin isolating plate. Generally, the thin isolating plate surrounds one single light source or a plurality of light sources to form a rectangular matrix. The traditional optical isolator 410 is not designed to have any additional optical property and is only used to block side-emitting light that is emitted by the light source within a certain area to prevent the side-emitting light from interfering the brightness control of the other area. Therefore, the reflecting device 340 is used as an optical isolator in this embodiment to control the directivity of the light emitted from the light source 322 for enhancing the brightness of the backlight unit, besides the original purpose and function of an optical isolator.

Figure 3G:
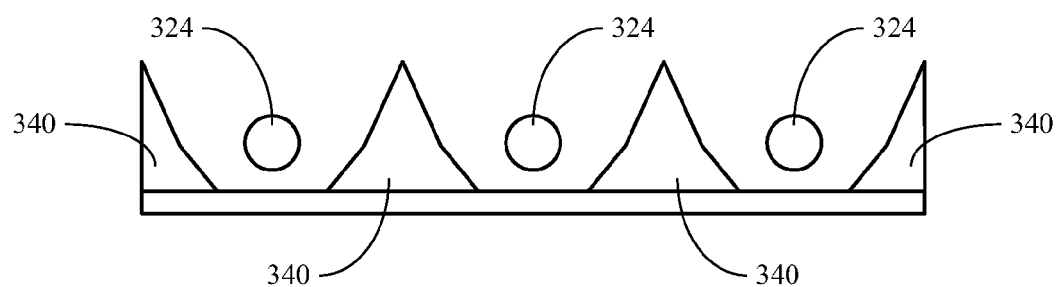
FIG. 3G shows a cross-sectional diagram illustrating a reflecting device surrounding the two sides of one single cold cathode fluorescent lamp (CCFL) according to the present invention.
Figure 3H:
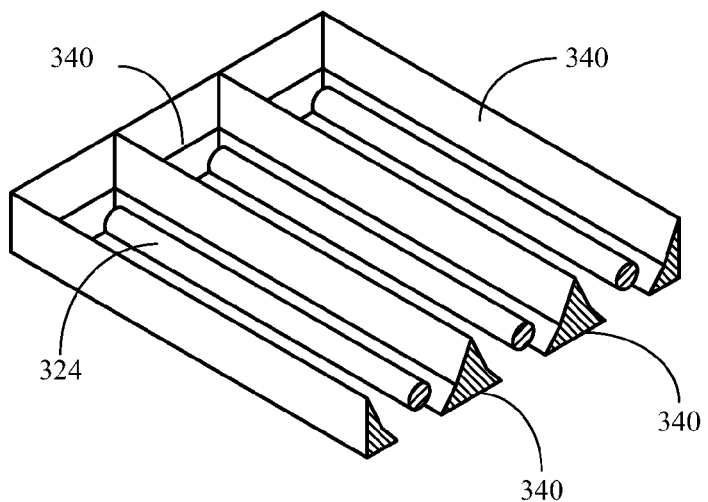
FIG. 3H is a three-dimensional schematic diagram of FIG. 3G.

In another embodiment, the light source module 300 has a cold cathode fluorescent lamp (CCFL) light source structure and the reflecting device 340 surrounds the two sides of the CCFL 324 or the two sides of the light source module. FIG. 3G shows a cross-sectional diagram illustrating the reflecting device surrounding the two sides of one single cold cathode fluorescent lamp (CCFL) while FIG. 3H is a three-dimensional schematic diagram of FIG. 3G.

Besides, the above mentioned backlight unit 300 may comprise one of the followings or combination thereof: a diffusing film and a brightness enhancement film (BEF).

On the other hand, as the reflecting device according to the invention is applied in a 22 inch direct type backlight unit with a thickness of 20 mm, the backlight unit has brightness uniformity of 83% and an axial brightness gain of 87.18%.

The present invention provides a method for enhancing light directivity of a backlight unit in a liquid crystal display (LCD), comprising: providing a direct type light source module that comprises at least one light source; and providing a reflecting device that surrounds the light source or the light source module to reflect light emitted from the light source and direct the light toward a same direction. In addition, the reflecting device comprises a first surface and a second surface. The first surface and the second surface are provided separately on the two sides, opposing to each other, of the reflecting device. At least one of the first surface and the second surface comprises at least two planes. In the at least two planes, every two planes are connected with an included angle more than 90 degrees and less than 180 degrees.

The present invention provides a method for enhancing light directivity of a lighting apparatus, comprising: providing a light source module that comprises at least one light emitter; and providing a reflecting device that surrounds the light emitter or the light source module to reflect light emitted from the light emitter and direct the light toward a same direction. In addition, the reflecting device comprises a first surface and a second surface. The first surface and the second surface are provided separately on the two sides, opposing to each other, of the reflecting device. At least one of the first surface and the second surface comprises at least two planes. In the at least two planes, every two planes are connected with an included angle more than 90 degrees and less than 180 degrees. The lighting apparatus can be, for example, a car light, a street light, or a flashlight.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A backlight unit having a reflecting device to enhance light directivity, comprising:
   a light source module comprising at least one light source; and
   a reflecting device provided around said light source module, wherein said reflecting device comprises a first surface and said first surface comprises at least two planes in which every two planes are connected with an included angle more than 90 degrees and less than 180 degrees;
   wherein said first surface is made of material having a reflecting or scattering property, said light source module is a direct type light emitting diode (LED) light source structure, said reflecting device surrounds said light source module to form any one of the following: a circle, an ellipse, a parallelogram, a square, or any other polygon.

2. The backlight unit according to claim 1, wherein said reflecting device further comprises a second surface and said second surface comprises at least two planes in which every two planes are connected with an included angle more than 90 degrees and less than 180 degrees, wherein said second surface is made of material having a reflecting or scattering property.

3. The backlight unit according to claim 1, wherein said at least two planes of said first surface form a concave surface, said concave surface has a notch facing toward said light source module, and said concave surface reflects the light side-emitted from said light source module to direct the light toward the vertical direction of said light source module.

4. The backlight unit according to claim 2, wherein said at least two planes of said second surface form a concave surface, said concave surface has a notch facing toward another light source, and said concave surface reflects the light side-emitted from said another light source to direct the light toward the vertical direction of said another light source.

5. The backlight unit according to claim 1, wherein said direct type light emitting diode (LED) light source structure is a side-emitting LED.

6. The backlight unit according to claim 1, applicable in adaptive dimming technique, wherein said reflecting device is an optical isolator in the adaptive dimming technique.

7. The backlight unit according to claim 1, further comprising one of the following or combination thereof: a diffusing film and a brightness enhancement film(BEF).

8. A method for enhancing light directivity of a backlight unit in a liquid crystal display (LCD), comprising:
   providing a direct type light source module that comprises at least one light source; and
   providing a reflecting device that surrounds said direct type light source module to reflect light emitted from said direct type light source module and direct the light toward a same direction, wherein said reflecting device comprises a first surface, said first surface comprises at least two planes in which every two planes are connected with an included angle more than 90 degrees and less than 180 degrees, and said first surface is made of material having a reflecting or scattering property, wherein said direct type light source module is a direct type light emitting diode (LED) light source structure, said reflecting device surrounds said direct type light source module to form any one of the following: a circle, an ellipse, a parallelogram, a square, or any other polygon, and said direct type light emitting diode (LED) light source structure is a side-emitting LED.

9. The method according to claim 8, wherein said reflecting device further comprises a second surface and said second surface comprises at least two planes in which every two planes are connected with an included angle more than 90 degrees and less than 180 degrees, wherein said second surface is made of material having a reflecting or scattering property.

10. The method according to claim 8, wherein said at least two planes of said first surface form a concave surface, said concave surface has a notch facing toward said direct type light source module, and said concave surface reflects the light side-emitted from said direct type light source module to direct the light toward the vertical direction of said direct type light source module.

11. The method according to claim 9, wherein said at least two planes of said second surface form a concave surface, said concave surface has a notch facing toward another light source, and said concave surface reflects the light side-emitted from said another light source to direct the light toward the vertical direction of said another light source.

* * * * *